(12) United States Patent
Takenaka et al.

(10) Patent No.: US 9,906,331 B2
(45) Date of Patent: Feb. 27, 2018

(54) COMMUNICATION METHOD, INFORMATION PROCESSING APPARATUS AND RECORDING MEDIUM

(71) Applicant: FUJITSU LIMITED, Kawasaki-shi, Kanagawa (JP)

(72) Inventors: Takahiro Takenaka, Kobe (JP); Minoru Inoue, Himeji (JP); Daisuke Fujita, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 14/138,914

(22) Filed: Dec. 23, 2013

(65) Prior Publication Data

US 2014/0189105 A1 Jul. 3, 2014

(30) Foreign Application Priority Data

Dec. 28, 2012 (JP) ................. 2012-286543

(51) Int. Cl.
*G06F 15/173* (2006.01)
*H04L 1/18* (2006.01)
*H04L 29/06* (2006.01)
*H04L 1/00* (2006.01)

(52) U.S. Cl.
CPC .......... *H04L 1/1819* (2013.01); *H04L 1/0076* (2013.01); *H04L 69/16* (2013.01)

(58) Field of Classification Search
CPC ....... H03M 13/03; H04L 69/16; H04L 1/0076
USPC ....................................................... 709/224
See application file for complete search history.

(56) References Cited

U.S. PATENT DOCUMENTS

| | | | | |
|---|---|---|---|---|
| 6,292,834 B1* | 9/2001 | Ravi | ................. | H04L 29/06027 375/E7.004 |
| 6,754,228 B1* | 6/2004 | Ludwig | ................... | H04L 47/10 370/231 |
| 7,346,007 B2* | 3/2008 | Curcio | .............. | H04L 29/06027 370/252 |
| 7,457,868 B1* | 11/2008 | Guo | ...................... | H04L 41/046 709/203 |
| 7,532,642 B1* | 5/2009 | Peacock | .............. | H04L 43/0864 370/252 |

(Continued)

FOREIGN PATENT DOCUMENTS

| | | |
|---|---|---|
| JP | 2007-36960 | 2/2007 |
| JP | 2007-235356 | 9/2007 |
| WO | WO 2005/006673 | 1/2005 |

*Primary Examiner* — Joseph E Avellino
*Assistant Examiner* — Binod J Kunwar
(74) *Attorney, Agent, or Firm* — Staas & Halsey LLP

(57) ABSTRACT

A communication method executed by an information processing apparatus capable of transmitting data of a plurality of sessions to another information processing apparatus, the method includes: acquiring from the another information processing apparatus processing time information according to a time taken for processing a first data received by the another information processing apparatus; calculating an upper limit value of an amount of data per unit time permitted to each of the plurality of sessions for transmission using the processing time information; and limiting the amount of data for each of the plurality of sessions based on the upper limit value calculated at the calculating upon transmitting a second data including data of one or more sessions to the another information processing apparatus.

16 Claims, 14 Drawing Sheets

(56) References Cited

U.S. PATENT DOCUMENTS

| | | | | |
|---|---|---|---|---|
| 7,558,289 B1* | 7/2009 | Bidichandani | H04W 28/06 | 370/466 |
| 7,558,869 B2* | 7/2009 | Leon | H04L 29/06027 | 370/235 |
| 7,636,310 B2* | 12/2009 | Senta | H04L 1/1678 | 370/235 |
| 7,944,908 B2* | 5/2011 | Lee | H04L 1/0014 | 370/351 |
| 7,962,637 B2* | 6/2011 | Su | H04N 21/234363 | 709/230 |
| 8,332,896 B2* | 12/2012 | Shelby | H04L 65/607 | 714/751 |
| 8,462,659 B2* | 6/2013 | Hong | H04L 43/0894 | 370/252 |
| 8,477,624 B2* | 7/2013 | Waltermann | H04L 41/042 | 370/235 |
| 8,514,715 B2* | 8/2013 | Jin | H04L 47/12 | 370/235 |
| 8,605,745 B2* | 12/2013 | Isobe | H04L 1/187 | 370/464 |
| 8,879,561 B2* | 11/2014 | Chamas | H04L 47/525 | 370/395.2 |
| 2001/0015956 A1* | 8/2001 | Ono | H04L 1/0007 | 370/229 |
| 2002/0194361 A1* | 12/2002 | Itoh | H04L 1/0002 | 709/233 |
| 2004/0261001 A1* | 12/2004 | Chang | H03M 13/2906 | 714/784 |
| 2005/0201375 A1* | 9/2005 | Komatsu | H04L 43/50 | 370/389 |
| 2005/0286416 A1* | 12/2005 | Shimonishi | H04L 1/1671 | 370/229 |
| 2006/0039381 A1* | 2/2006 | Anschutz | H04L 47/14 | 370/395.21 |
| 2006/0056300 A1* | 3/2006 | Tamura | H04L 12/5602 | 370/235 |
| 2006/0250959 A1* | 11/2006 | Porat | H04L 12/5695 | 370/230 |
| 2008/0101406 A1* | 5/2008 | Matoba | H04L 47/10 | 370/468 |
| 2008/0159140 A1* | 7/2008 | Robinson | H04L 12/2801 | 370/232 |
| 2008/0168116 A1* | 7/2008 | Oda | H04L 43/0852 | 708/290 |
| 2009/0019178 A1* | 1/2009 | Melnyk | H04L 47/10 | 709/233 |
| 2009/0271681 A1* | 10/2009 | Piret | H04L 1/1819 | 714/749 |
| 2009/0287985 A1* | 11/2009 | Okabe | G06F 11/1008 | 714/807 |
| 2010/0299552 A1* | 11/2010 | Schlack | H04L 47/10 | 714/4.1 |
| 2011/0292803 A1* | 12/2011 | Nishioka | H04L 1/0003 | 370/236 |
| 2012/0063493 A1* | 3/2012 | Hasegawa | H04L 47/724 | 375/211 |
| 2012/0189006 A1* | 7/2012 | Isobe | H04L 1/187 | 370/389 |
| 2012/0243410 A1* | 9/2012 | Vedula | H04L 41/5025 | 370/235 |
| 2012/0257671 A1* | 10/2012 | Brockmann | H04N 21/64753 | 375/240.02 |
| 2013/0315253 A1* | 11/2013 | Hegland | H04L 47/33 | 370/400 |
| 2014/0099966 A1* | 4/2014 | Hori | H04W 36/0022 | 455/450 |
| 2015/0029861 A1* | 1/2015 | Yazaki | H04L 69/16 | 370/235.1 |

* cited by examiner

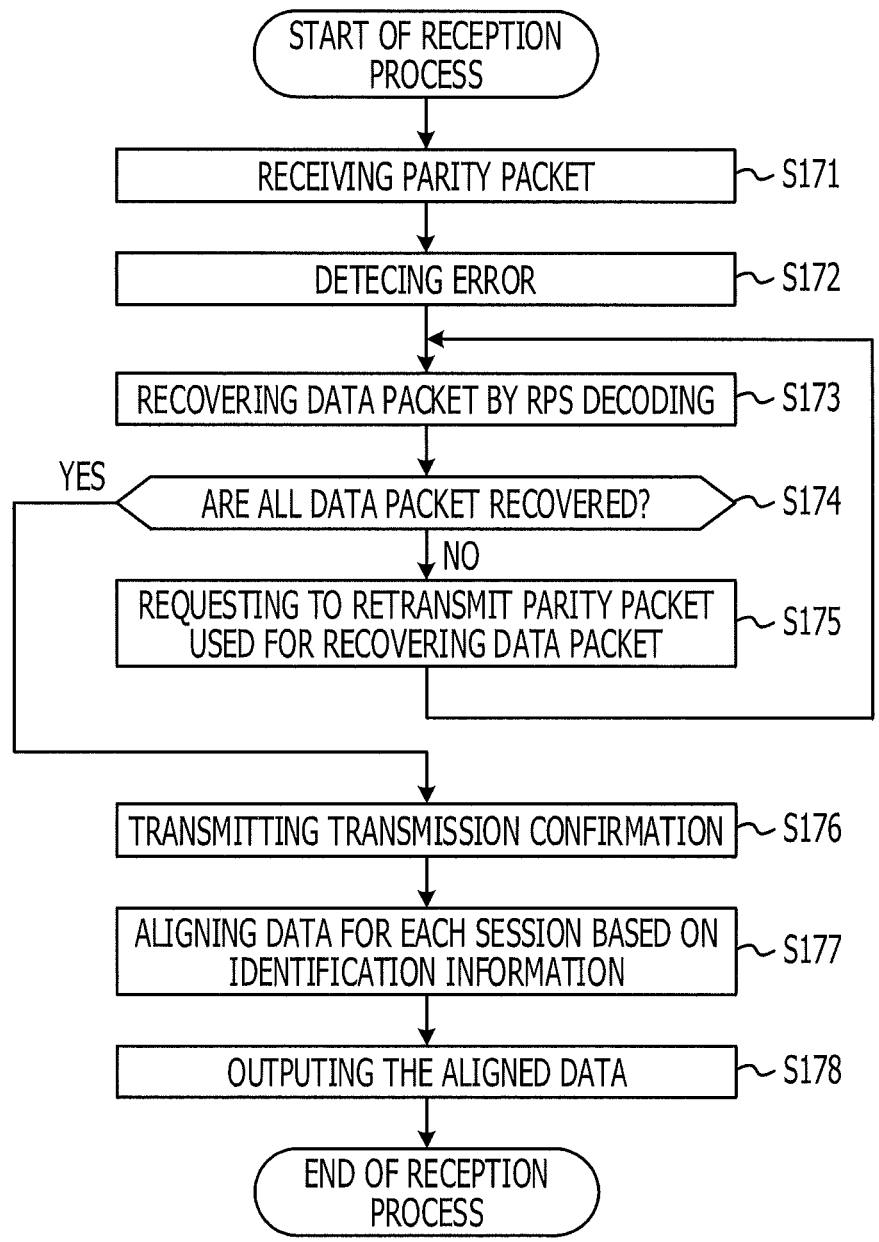

COMMUNICATION METHOD, INFORMATION PROCESSING APPARATUS AND RECORDING MEDIUM

CROSS-REFERENCE TO RELATED APPLICATION

This application is based upon and claims the benefit of priority from the prior Japanese Patent Application No. 2012-286543 filed on Dec. 28, 2012, the entire contents of which are incorporated herein by reference.

FIELD

The present disclosure relates to a communication method, an information processing apparatus, and a recording medium.

BACKGROUND

Various networks such as the Internet, a local area network (LAN), a wide area network (WAN), a mobile telephone network are being utilized for data communications. In a data communication network, a band control is often performed in order to avoid a situation where excessive traffic occurs on finite number of communication resources to cause a communication failure. In the band control, band may be limited for each communication entity from a viewpoint of ensuring impartiality between communication entities such as a user, an information processing apparatus and an application software.

For example, a band control apparatus has been proposed in which a band used by one or two or more Transmission Control Protocol (TCP) sessions and established by the user are summed up for each user, and the band is limited for the user whose total used band exceeds a threshold value. The band control apparatus decreases the TCP window size of a user to be subjected to the band limitation or delays the returning of ACK packet from TCP to implement the band limitation for each user.

In the meantime, a call connection system has been proposed in which a maximum band available in a communication terminal is measured, and, for example, an encoding speed, a packet length, a packet transmission interval, a packet priority and a codec class are dynamically changed according to whether the maximum band is the threshold value or more. The call connection system calculates the maximum band in the communication terminal based on a round-trip delay time of a packet or a packet loss ratio. Further, a data multiplexing method has been proposed in which data supplied from a plurality of sources are multiplexed for transferring. The data multiplexing method appends a session identifier and a packet serial number to data as header information upon multiplexing data.

International Publication No. WO 2005/006673, Japanese Patent Application Laid-Open No. 2007-36960 and Japanese Patent Application Laid-Open No. 2007-235356 have been known as prior art.

SUMMARY

According to one aspect of the embodiments, there is provided a communication method executed by an information processing apparatus capable of transmitting data of a plurality of sessions to another information processing apparatus. The communication method includes acquiring from the another information processing apparatus processing time information according to a time taken for processing a first data received by the another information processing apparatus, calculating an upper limit value of an amount of data per unit time permitted to each of the plurality of sessions for transmission using the processing time information, and limiting the amount of data for each of the plurality of sessions based on the upper limit value calculated at the calculating upon transmitting a second data including data of one or more sessions to the another information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 14 is a view explaining a flow of a reception process according to the second embodiment.

DESCRIPTION OF EMBODIMENT(S)

The band limitation may be performed for each session when the transmission apparatus is able to transmit data of the plurality of sessions to the reception apparatus from the viewpoint of impartiality between the sessions. However, the conventional band limitation has been performed mainly based on the communication state of a network. Therefore, when a bottleneck occurs in the load for data processing of the reception apparatus, there is a possibility that the transmission apparatus transmits excessive amounts of data to the reception apparatus using an empty communication band. As a result, there is a problem in that the convention band limitation method becomes unable to sufficiently ensure the impartiality between the plurality of sessions and thus, an object of the band limitation may not be sufficiently achieved.

For example, it is assumed that transmission of data of a session #1 starts such that the communication band of the network is not occupied and then, transmission of data of a session #2 starts. There is a margin in the communication band and thus, it is expected that data of the session #2 may be effectively transmitted. However, when the reception apparatus performs a processing (e.g., an error correction decoding) which requires a large quantity of calculation and a low speed processing (e.g., a writing of data into the auxiliary storage device) for data of the session #1 received previously, the data processing may be in a bottleneck. In such a case, for example, reception of the session #2 data may be temporarily rejected from the reception apparatus. The excessive transmission of the session #1 data is considered to be one of the reasons of being rejected.

In the meantime, the "session" in a case where the problem described above occurs may be required to be simply a logical communication unit that can distinguish each of a plurality of data streams. For example, a data group for which the communication entity, such as the user, the information processing apparatus or the application software, is the same may be handled as a data group which belongs to the same session. Further, similarly to a TCP session, a logical communication unit which may be established in a plurality of times and in parallel by the same communication entity may be handled as the "session".

Hereinafter, embodiments will be described with reference to accompanying drawings.

First Embodiment

A first embodiment will be described.

Figure 1:
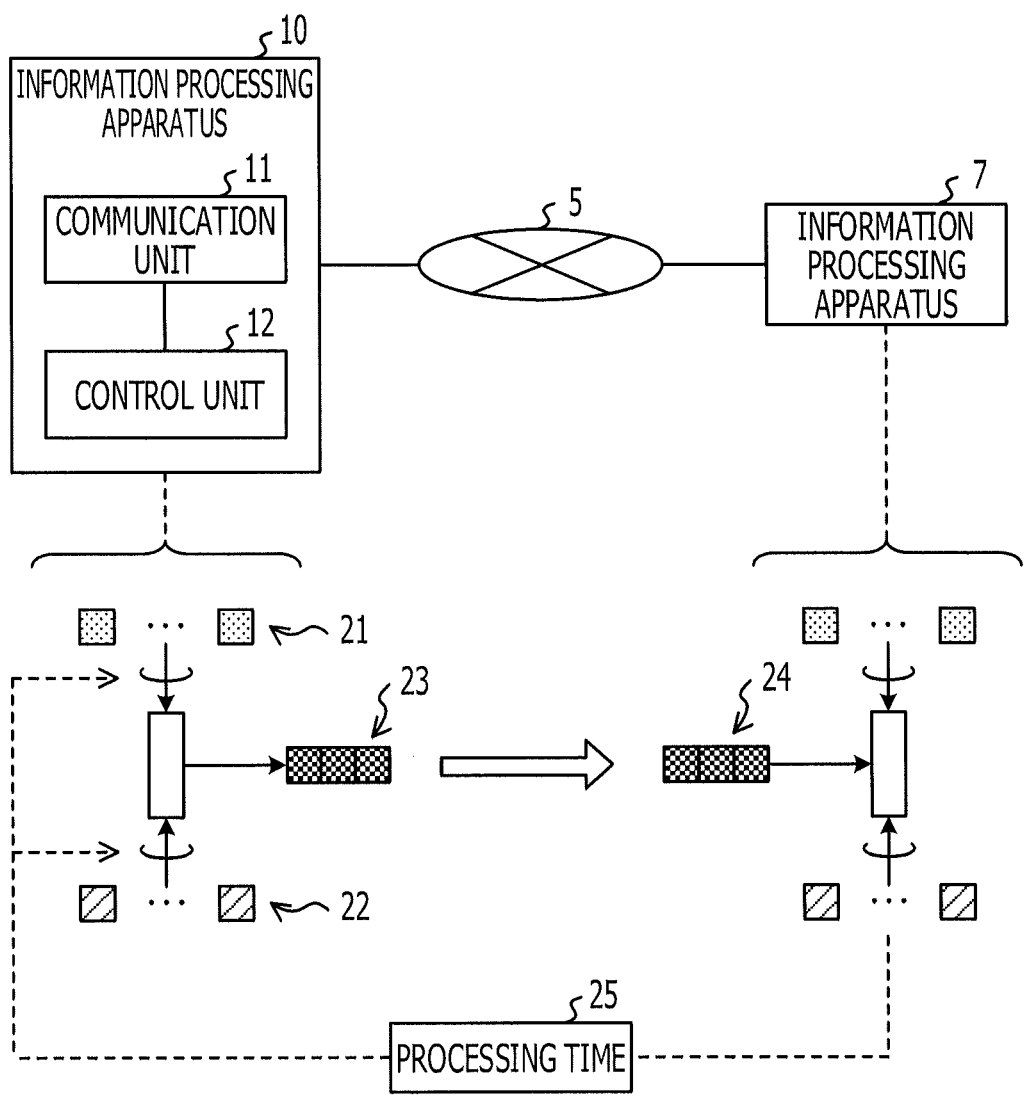
FIG. 1 is a view illustrating an exemplary information processing apparatus according to a first embodiment.

FIG. 1 is a view illustrating, for example, an exemplary information processing apparatus according to a first embodiment. As illustrated in FIG. 1, an information processing apparatus 10 according to the first embodiment includes a communication unit 11 and a control unit 12. Further, the information processing apparatus 10 is coupled with the other information processing apparatus 7 through a network 5.

Although not illustrated, each of the information processing apparatus 10 and the information processing apparatus 7 includes a storage device. The storage device may be a volatile storage device such as a random access memory (RAM) or a non-volatile storage device such as a hard disk drive (HDD) or a flash memory.

Further, the control unit 12 may be a processor such as a central processing unit (CPU) or a digital signal processor (DSP). Further, the control unit 12 may also be an electronic circuit such as an application specific integrated circuit (ASIC) or a field programmable gate array (FPGA). Further, the control unit 12 executes a program stored in the storage device described above or other memory.

The information processing apparatus 10 may transmit data 21, 22 of the plurality of sessions to the other information processing apparatus 7. For example, the information processing apparatus 10 may generate a data packet in which identification information identifying the session is appended to the data 21, 22, and encode the data packet to be transmitted to the other information processing apparatus 7.

The communication unit 11 receives, from the other information processing apparatus 7, the processing time information 25 according to a processing time taken for processing the received first data 24 by the other information processing apparatus 7. For example, the communication unit 11 transmits the data packet including known data to the other information processing apparatus 7 and acquires the processing time information including a time taken for processing the known data. The processing time includes, for example, a time taken for a decoding process or a data writing process.

Further, the communication unit 11 transmits a second data 23 including data 21, 22 of one or two or more sessions to the other information processing apparatus 7. Using the processing time information 25, the control unit 12 calculates an upper limit value of an amount of data per unit time which is permitted for transmission with respect to each of the plurality of sessions. The control unit 12 limits the data amount for each session based on the calculated upper limit value upon transmitting the second data 23. As such, the data amount capable of being transmitted for each session is limited according to the processing time of the reception side and thus, it is possible to reduce a risk that transmission delay of a certain session increases.

Second Embodiment

A second embodiment will be described.

(System Description)

Figure 2:
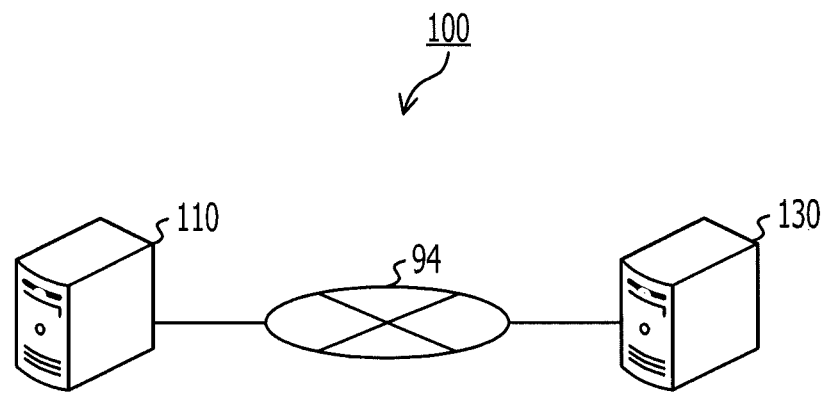
FIG. 2 is a view illustrating an exemplary communication system according to a second embodiment.

Descriptions will be made on the communication system 100 according to a second embodiment with reference to FIG. 2. FIG. 2 is a view illustrating an exemplary communication system according to a second embodiment.

As illustrated in FIG. 2, the communication system 100 includes an information processing apparatus 110 and an information processing apparatus 130 coupled to the information processing apparatus 110 through a network 94. In the following description, the information processing apparatus 110 may be referred to as a transmission side and the information processing apparatus 130 may be referred to as a reception side. Further, descriptions will be made on an exemplary case where data is transmitted from the information processing apparatus 110 to the information processing apparatus 130. However, data may well be transmitted from the information processing apparatus 130 to the information processing apparatus 110.

Information processing apparatuses 110 and 130 may be represented as a stationary type computer in the example of FIG. 2, but may be any other type of computer than the stationary type computer. For example, the information processing apparatus 110 may be a notebook PC, a tablet computer, a portable telephone, a smart phone, a digital camera or a car navigation system. Further, the information processing apparatus 110 may be a wireless base station, a wireless communication terminal, a router, a hub, a modem, a communication equipment for satellite communication, or other type of communication equipments. The same applies to the information processing apparatus 130.

The information processing apparatus 110 is represented as a single computer in the example of FIG. 2, but may be a parallel type computer to which a plurality of computers are coupled or may be a cloud computing system. In this case, some or all of the functions implemented in the information processing apparatus 110 are implemented using a plurality of computers. In the meantime, the matters described above may be similarly applied to the information processing apparatus 130. Further, the functionality of one of the information processing apparatuses 110 and 130 may be implemented by a single computer and the functionality of other information processing apparatuses 110 and 130 may be implemented by a plurality of computers.

(Hardware)

Figure 3:
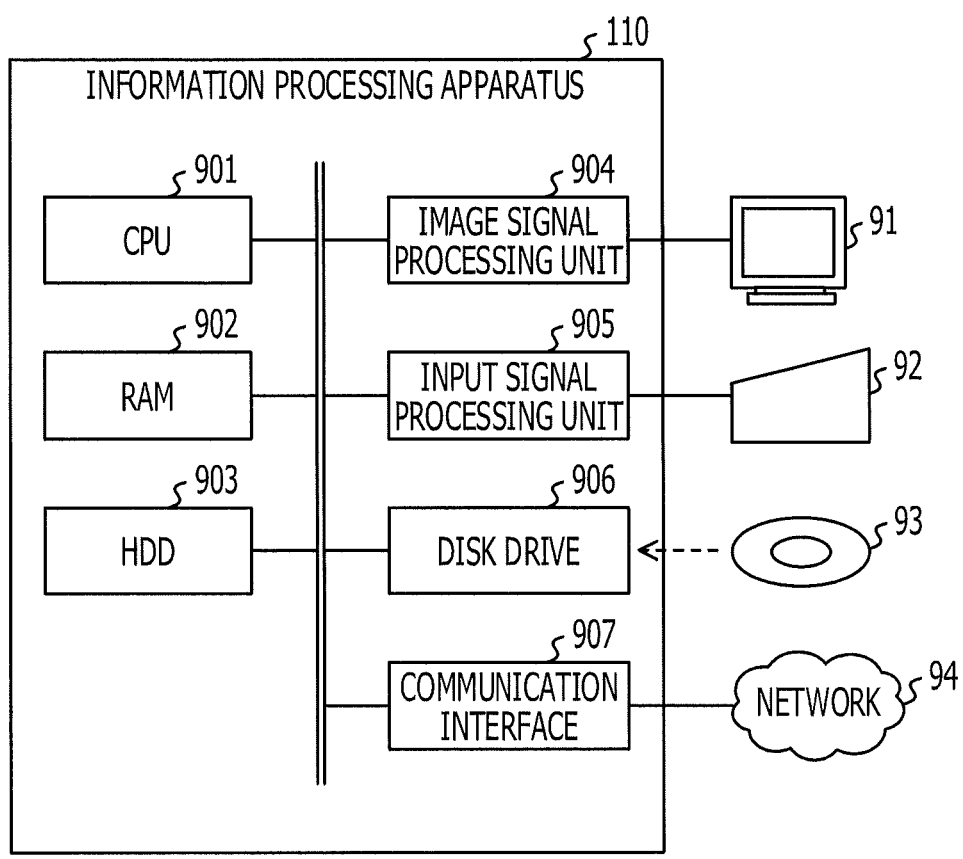
FIG. 3 is a view illustrating exemplary hardware of the information processing apparatus according to the second embodiment.

The functionality of the information processing apparatus 110 may be implemented by the hardware represented in FIG. 3. FIG. 3 is a view illustrating an exemplary hardware of the information processing apparatus according to the second embodiment. While a combination of the hardware components illustrated in FIG. 3 is an example, some components may be omitted or a new component may be added thereto.

As illustrated in FIG. 3, the information processing apparatus 110 includes, for example, a CPU 901, a RAM 902, a HDD 903, an image signal processing unit 904, an input signal processing unit 905, a disk drive 906 and a communication interface 907.

The CPU 901 is an example of the control unit 12 according to the first embodiment. Further, the RAM 902 and the HDD 903 are examples of a storage device according to the first embodiment. The communication interface 907 is an example of the communication unit 11 according to the first embodiment.

The CPU 901 is a processor including an operational device which executes instructions described in, for example, a program. The CPU 901 loads at least some of data or program stored in the HDD 903 into the RAM 902 and executes instructions described in the program. Additionally, the CPU 901 may include a plurality of processor cores. Further, the information processing apparatus 110 may be installed with a plurality of CPUs 901. In this case, the information processing apparatus 110 may perform a processing with a parallel execution.

The RAM 902 is a volatile memory for temporarily storing a program executed by the CPU 901 or data used in the processing. The information processing apparatus 110 may include other type of memory than the RAM 902. Further, the information processing apparatus 110 may include a plurality of memories.

The HDD 903 is an example of a non-volatile storage device for storing a program such as an operating system (OS), firmware, an application software, or data used in the processing. Further, the information processing apparatus 110 may include another type of storage device, such as a flash memory or a solid state drive At SSD), which is different from the HDD 903. Further, the information processing apparatus 110 may include a plurality of storage devices.

The image signal processing unit 904 is controlled by the CPU 901 to output an image to a display device 91 coupled to the information processing apparatus 110. The display device 91 may be, for example, a cathode ray tube (CRT), a liquid crystal display (LCD), a plasma display panel (PDP), an organic electro-luminescence display (OELD).

The input signal processing unit 905 acquires an input signal from an input device 92 coupled to the information processing apparatus 110 and notifies the CPU 901. For example, a mouse, a keyboard, a touch panel, a touch pad, a track ball, a remote controller or a button switch may be used as the input device 92.

The disk drive 906 is a reading-out apparatus which reads the program or data recorded in a recording medium 93. A magnetic disk such as a flexible disk (FD) or a HDD, an optical disk such as a compact disk (CD) or a digital versatile disk (DVD), and an optomagnetic disk such as a magneto-optical disk (MO) may be used as the recording medium 93. The disk drive 906 is controlled by, for example, the CPU 901 to store the program or data read from the recording medium 93 in the RAM 902 or the HDD 903.

The communication interface 907 is an interface for communicating with other computer through the network 94. The communication interface 907 may be either a wired interface or a wireless interface. Further, the communication interface 907 may be a communication interface utilized for a satellite communication or a communication interface for coupling to the mobile telephone network.

(Function of Information Processing Apparatus 110)

Figure 4:
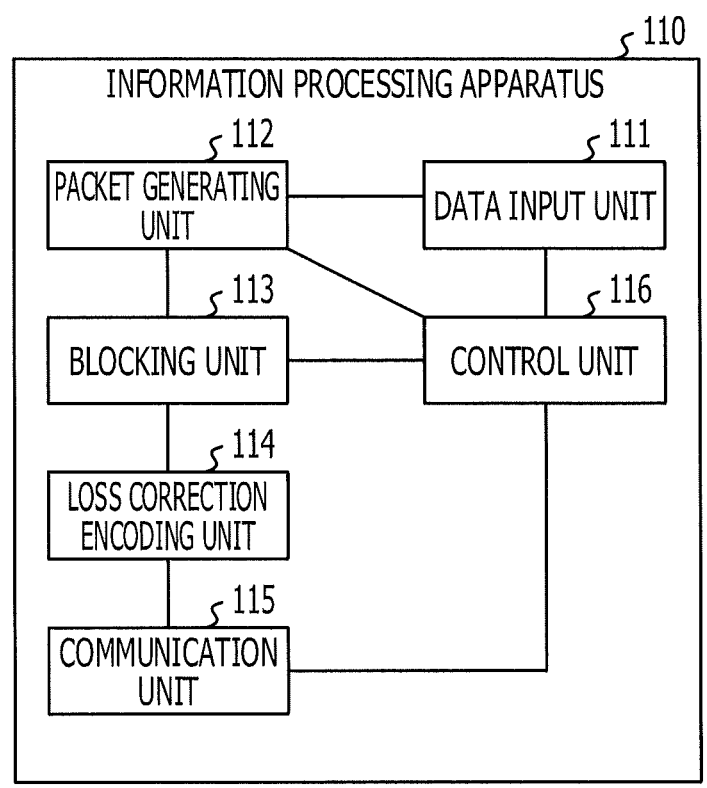
FIG. 4 is a block diagram illustrating an example of a function of the information processing apparatus of a transmission side according to the second embodiment.

The information processing apparatus 110 may implement functions as illustrated in FIG. 4 using the hardware as described above. FIG. 4 is a block diagram illustrating an example of function of an information processing apparatus of a transmission side according to the second embodiment.

As illustrated in FIG. 4, the information processing apparatus 110 includes a data input unit 111, a blocking unit 113, a packet generating unit 112, a loss correction encoding unit 114, a communication unit 115 and a control unit 116.

Some or all of functions implemented in the blocking unit 113, the packet generating unit 112, the loss correction encoding unit 114, the communication unit 115 and the control unit may be implemented as a program module executed by the CPU 901. Further, some or all of functions implemented in the blocking unit 113, the packet generating unit 112, the loss correction encoding unit 114, the communication unit 115 and the control unit may be implemented by an electronic circuit rather than software.

Data to be transmitted to the information processing apparatus 130 of the reception side is input to the data input unit 111. Data input to the data input unit 111 may be provided from the application software executed by an external computer which is different from the information processing apparatus 110, or the application software executed by the information processing apparatus 110. Here, descriptions will be made on a situation where data is input to the data input unit 111 from the plurality of other application software.

In the meantime, an application software regularly activated to be resident after activation of the information processing apparatus 110 is assumed as an example of the application software. It is assumed that the number of application software is set in advance. However, the application software being activated or the application software which is transmitting data may be modified to be dynamically detected by the data input unit 111.

A single application software may establish a plurality of sessions. The application software designates the port number to the transport layer and thus, the session is established. In this case, the application software of the transmission side designates the port number of the transmission source and the application software of the reception side designates the number of the destination port. The number of the sessions established by each application software is dynamically changed. The number of the sessions established at a certain time is grasped or understood by the transport layer.

Data input from the application software as described above to the data input unit 111 is input to the packet generating unit 112. The packet generating unit 112 then appends a header to the data to generate a data packet. The header includes information such as the session identification information (Session ID), which corresponds to each data, or a data length. In the meantime, each data is assorted for each session (for each port number of the transport layer) and delivered and received to and from the application software. In this case, the session ID is retrieved. The data packet generated by the packet generating unit 112 is input to the blocking unit 113.

The blocking unit 113 makes data input from the packet generating unit 112 into a block (e.g., blocking). Herein, the blocking refers to a process in which a predetermined amount of data packets are accumulated and the accumulated data are managed as a so-called packet group (block). In this case, the blocking unit 113 allows the data packets of data input from a plurality of other application software to be allocated to the same block to perform the blocking of the data packets.

As such, the data packets of data input from a plurality of the application software are allowed to be mixed and thus, delay in data transmission of the other application software may be suppressed as compared to a case where a single block is occupied by a single application software.

When an allocation of the data packets to a block is continued and thus, the number of the allocated data packets reaches the number of data packets that may be allocated to the block (when the block is fully filled), the blocking unit 113 registers the block in a block list. The block list is information for registering an encodable block. When a certain block is fully filled, the blocking unit 113 allocates the data packet to the next block of the corresponding block.

The loss correction encoding unit 114 encodes the plurality of data packets corresponding to a block registered in the block list to generate a plurality of parity packets. As such, the block list is utilized and thus, the blocking process by the blocking unit 113 and the encoding process by the loss correction encoding unit 114 may be performed asynchronously.

For example, an encoding scheme using a loss correction code, such as an RPS code, may be applied. The loss correction code is a type of FEC code. In a scheme using the FEC code, redundancy is added to data in advance in the transmission side, such that an original data may be recovered even when some packets are lost on a transmission path without obtaining additional information from the reception side.

The plurality of parity packets generated for each block by the loss correction encoding unit 114 are input to the communication unit 115. Further, an error detection code such as a cyclic redundancy check (CRC) may be appended to each parity packet. The communication unit 115 transmits the plurality of parity packets generated by the loss correction encoding unit 114 to the information processing apparatus 130 of the reception side.

The control unit 116 acquires information indicating the load condition in the information processing apparatus 130 of the reception side. For example, the control unit 116 transmits a dummy parity packet formed by a loss correction encoding of the dummy packet provided in advance to the information processing apparatus 130 of the reception side through the communication unit 115 in order for the information processing apparatus 130 of the reception side to measure the processing time taken for recovering the dummy packet. Also, the control unit 116 acquires the processing speed information indicating the processed data amount per unit time from the information processing apparatus 130 of the reception side as information indicating the load condition.

In the meantime, instead of the method which acquires the processing speed information, a method may be considered in which information indicating the processing time and the data amount of the recovered data are acquired and the control unit 116 calculates the processing speed information from the acquired information. In this case, the control unit 116 that has acquired information indicating the processing time and the data amount calculates the processing speed information indicating the processed data amount per unit time using the acquired information. However, descriptions will be made in the following on an assumption that the processing speed information is obtained from the information processing apparatus 130 of the reception side.

The control unit 116 limits the band upon transmitting data to the information processing apparatus 130 of the reception side based on the processing speed information acquired from the information processing apparatus 130 of the reception side. The control unit 116 sets a transmission rate of data capable of being output to the information processing apparatus 130 of the reception side to the acquired processing speed. The control unit 116 allocates the transmission rate for each session.

First of all, the control unit 116 allocates the transmission rate for each application software. For example, when three application software are present, the control unit 116 divides the set transmission rate into three. When a certain application software has established a plurality of sessions, the control unit 116 further divides the transmission rate allocated to the application software into the number of sessions and allocates the divided transmission rate for each session.

The control unit 116 may control the number of data packets to be included in a single block based on the processing speed information acquired from the information processing apparatus 130 of the reception side. As described above, the control unit 116 controls the band to be allocated for each session according to the load condition of the information processing apparatus 130 of the reception side. For example, when the processing speed measured at the present time is slower than the processing speed measured at the previous time, the control unit 116 determines that the processing load of the information processing apparatus 130 of the reception side corresponds to a high state and reduces the band to be allocated for each session. In the meantime, when the processing speed measured at the present time is faster than the processing speed measured at the previous time, the control unit 116 increases the band to be allocated for each session.

The band control as described above is implemented in such a manner that the reception response with respect to the application software performed by the transport layer is controlled. Upon transmitting data, the application software designates the session (transmission source port number) and transfers data to the transport layer. The application software is required to receive a reception response with respect to data delivered previously from the transport layer in order to transmit next data. Therefore, the reception response may be delayed to limit the band.

For example, the control unit 116 delays the reception response in such a manner that the data amount received per unit time from the application software does not exceed the band allocated for each session. The control is performed as described above and thus, it is possible to avoid, for example, a situation where the recovering process by the information processing apparatus 130 of the reception side is not performed normally in time causing a receiving buffer overflow.

Further, the control unit 116 may further consider the network conditions such as a communication speed, the packet ratio and the round trip time (RTT) in addition to the processing speed in order to control the band to be allocated for each session. The communication speed is calculated based on the amount of data which would have been transmitted per unit time.

The packet ratio is a ratio of the data packets recovered by the loss correction decoding among the transmitted data packets. However, the packet ratio is calculated based on the number of data packets recovered before the start of the retransmission control. Further, the RTT is a difference between a time taken from a timing when the transmission starts to a timing when the transmission confirmation transmitted after the data packet had been recovered is received and a processing time. That is, the RTT is defined by a time calculated by subtracting a time taken for a process performed at the application layer from a time taken for transmitting and receiving the data packet.

For example, when the packet ratio is relatively high, the control unit 116 reduces the band to be allocated for each session or the amount of data to be allocated for each block. When the transmission speed is relatively fast, the control unit 116 increases the band to be allocated for each session or the amount of data to be allocated for each block within a range of the data amount capable of being processed determined from the processing speed. When the RTT is large, the control unit 116 increases the band to be allocated for each session or the amount of data to be allocated for each block.

In the meantime, the data amount to be allocated for each block is increased such that a large amount of data may be transmitted at a time, and the frequency of the transmission confirmation to be transmitted when the reception process is ended by using a single or a plurality of blocks as a reception unit may be reduced. On the contrary, the data amount to be allocated for each block may be decreased to reduce the decoding process load.

As described above, the band to be allocated for each session or the data amount to be allocated for each block is adjusted in consideration of the communication speed, the packet ratio and the RTT within a range of the data amount capable of being processed determined from the processing speed of the reception side and thus, throughput may be maintained in a better state.

When some of the data packets cannot be recovered at the information processing apparatus 130 of the reception side, the control unit 116 performs the retransmission control of the parity packet. For example, in a setting where the data packet #1 may be recovered from the parity packets A and B, when the parity packet B is lost on the transmission path, the data packet #1 becomes unrecoverable. In this case, the control unit 116 retransmits at least the parity packet B.

Descriptions have been made on the function of the information processing apparatus 110 of the transmission side.

(Function of Information Processing Apparatus 130)

Figure 5:
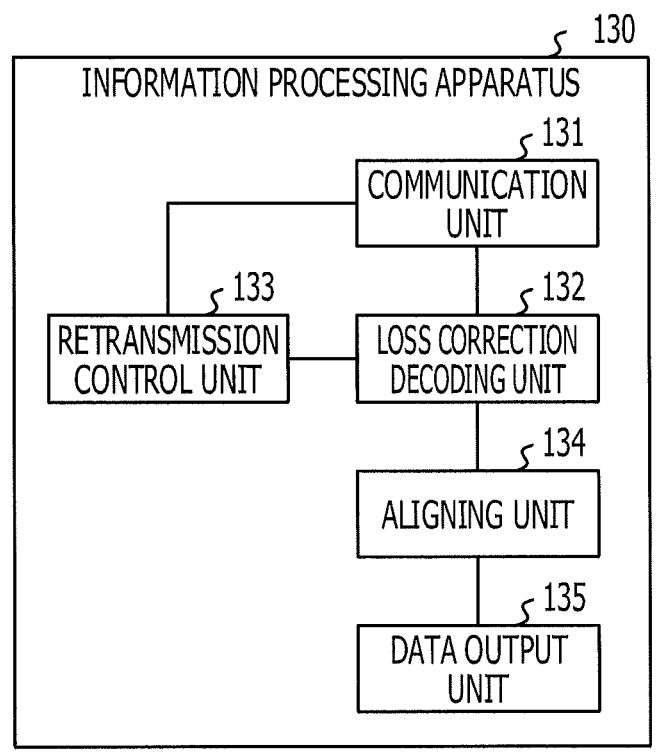
FIG. 5 is a block diagram illustrating an example of a function of the information processing apparatus of a reception side according to the second embodiment.

Subsequently, the function of the information processing apparatus 130 of the reception side will be described with reference to FIG. 5. FIG. 5 is a block diagram illustrating an example of the function of the information processing apparatus of the reception side according to the second embodiment. The functions implemented in the information processing apparatus 130 of the reception side may be implemented using hardware which is the same as that of the information processing apparatus 110 of the transmission side.

As illustrated in FIG. 5, the information processing apparatus 130 includes a communication unit 131, a loss correction decoding unit 132, a retransmission control unit 133, an aligning unit 134, and a data output unit 135.

In the meantime, some or all of the functions implemented in the communication unit 131, the loss correction decoding unit 132, the retransmission control unit 133, the aligning unit 134 and the data output unit 135 may be implemented as a program module executed by the CPU 901. Further, some or all of the functions implemented in the communication unit 131, the loss correction decoding unit 132, the retransmission control unit 133, the aligning unit 134 and the data output unit 135 may be implemented by an electronic circuit rather than software. Further, the storage unit 136 is a storage area secured in a RAM 902 and a HDD 903.

The communication unit 131 receives a plurality of parity packets corresponding to a single block transmitted from the information processing apparatus 110 of the transmission side. The plurality of parity packets received by the communication unit 131 are input to the loss correction decoding unit 132. The loss correction decoding unit 132 executes error detection for each parity packet. Further, the loss correction decoding unit 132 executes the loss correction decoding process to recover the original data packet using the correctly received parity packets among a plurality of parity packets which correspond to the corresponding block.

When an unrecoverable data packet is present, the loss correction decoding unit 132 requests the retransmission control unit 133 to request retransmission of the parity packet used for recovering the unrecoverable data packet.

For example, in a case where the parity packets A and B are utilized for recovering the data packet #1, when the parity packet B is lost on the transmission path, the data packet #1 becomes unrecoverable. In this case, the loss correction decoding unit 132 requests the retransmission control unit 133 to request retransmission of at least the parity packet B. The retransmission control unit 133, upon being requested for the retransmission, requests the information processing apparatus 110 of the transmission side to retransmit the parity packet used for recovering the unrecoverable data packet.

The retransmitted parity packet is received by the communication unit 131 and input to the loss correction decoding unit 132. The loss correction decoding unit 132 recovers the data packet which was not recoverable using the retransmitted parity packet and the parity packet received before the retransmission.

Such a retransmission control is repeatedly executed until all the data packets of a certain block are recovered. When all the data packets are recovered, the error correction decoding unit 132 inputs the recovered data packet to the aligning unit 134. The aligning unit 134 assorts the recovered data packet for each session. Further, when the data packets are out of order, the aligning unit 134 restores the original order of the data packets.

The data packets assorted for each session by the aligning unit 134 are input to the data output unit 135. The data output unit 135 outputs data of the data packets assorted for each session to the application software. For example, the data output unit 135 transfers data to the application software of the reception side or stores in a storage device equipped in the information processing apparatus 130 of the reception side or a storage device externally coupled thereto (e.g., an auxiliary storage device such as HDD).

In the meantime, when the communication unit 131 receives the parity packet formed by subjecting the dummy packet to the loss correction encoding, the loss correction decoding unit 132 performs the error detection process and the loss correction decoding process for the received parity packet in order to recover the dummy packet. In this case, the loss correction decoding unit 132 measures the processing time taken for the loss correction decoding process. Further, the loss correction decoding unit 132 calculates the processing speed indicating an amount of the processed data per unit time using the measured processing time information.

However, the loss correction decoding unit 132 may measure the time taken from a timing when the dummy packet recovery process starts to a timing when the data output unit 135 outputs data of the dummy packet as the processing time (e.g., a timing until writing of data into the auxiliary storage device is completed). In this case, the processing time including various processing time for processes performed in the application layer is measured in addition to the decoding process, and thus, the processing speed information may be obtained in which the load condition of the information processing apparatus 130 of the reception side is more accurately reflected. For example, a situation where a process other than the decoding process is in the overload condition such as a case where the processes are congested due to a concentration of accesses to the storage device, may be considered at the information processing apparatus 110 of the transmission side.

However, when the dummy packet recovery process is completed, the communication unit 131 transmits the transmission confirmation to the information processing apparatus 110 of the transmission side. The transmission confirmation includes the processing speed information calculated as described above. However, the transmission confirmation may include information indicating the processing time and the amount of the recovered data, instead of the processing speed information. As such, the transmission confirmation including the processing speed information is transmitted to the information processing apparatus 110 of the transmission side and thus, the band may be controlled according to the processing speed in the information processing apparatus 110 of the transmission side.

In the meantime, the transmission confirmation including the processing speed information may be transmitted only at a timing when the dummy packet recovery process is completed, otherwise may be transmitted at a timing when the recovery process for data corresponding to a single a plurality of blocks is completed. In the latter case, the band for each session may be controlled based on the processing speed information included in the transmission confirmation for a time period during which the data packets are actually being transmitted and thus, a dynamic control may become possible with which the load condition varying with the time is reflected in real time.

The function of the information processing apparatus 130 of the reception side has been described.

(Data Transmission Method Using RPS as Well as UDP)

Subsequently, a data transmission method will be described in which the RPS-encoded application software data is transmitted according to the User Datagram Protocol (UDP) by citing the RPS code as an example of the loss correction code.

Figure 6:
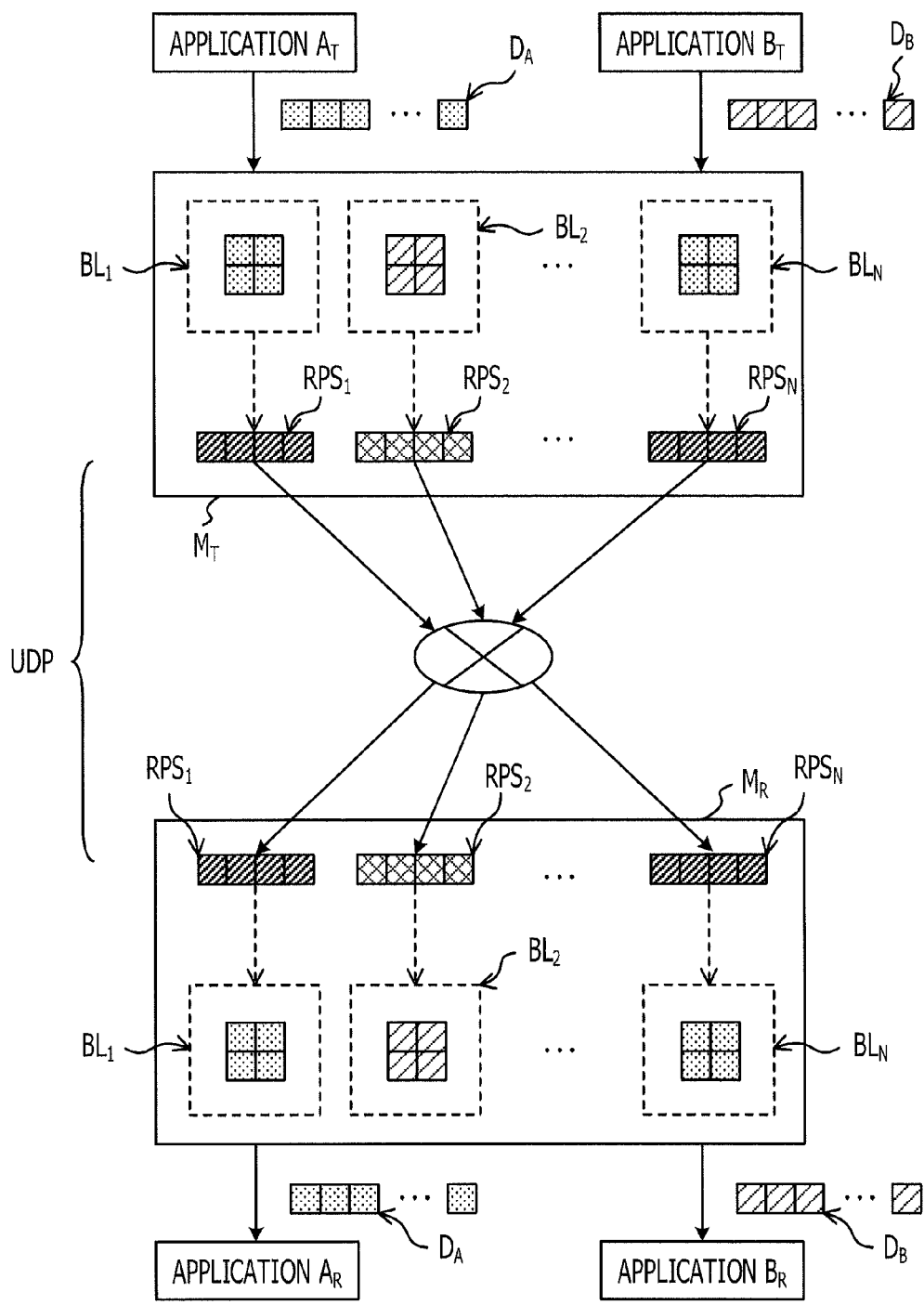
FIG. 6 is a view illustrating an exemplary data transmission method using the RPS code and UDP.

An application software data transmission method will be described first using the RPS code and UDP with reference to FIG. 6. FIG. 6 is a view explaining an application data transmission method using the RPS code and the UDP. The example of FIG. 6 illustrates a transmission process in which data $D_A$ and $D_B$ are transmitted from application software $A_T$ and $B_T$ of the transmission side to an application software $A_R$ and $B_R$ of the reception side, respectively.

Data $D_A$ provided from the application software $A_T$ are allocated to, for example, the block $BL_1$, by the middleware $M_T$. Further, data $D_B$ provided from the application software $B_T$ are allocated to, for example, the block $BL_2$, by the middleware $M_T$.

The middleware $M_T$ is software that runs on the information processing apparatus 110 of the transmission side. The middleware $M_T$ packetizes and RPS-encodes data allocated to the block $BL_1$ to generate an RPS code $RPS_1$. Similarly, the middleware $M_T$ generates the RPS codes $RPS_2, \ldots, RPS_N$ that correspond to the blocks $BL_2, \ldots, BL_N$, respectively. Further, the RPS codes $RPS_1, \ldots, RPS_N$ are examples of the parity packets.

The RPS codes $RPS_1, \ldots, RPS_N$ are transmitted to the middleware $M_T$ that runs on the information processing apparatus 130 of the reception side according to the UDP. The middleware $M_R$ RPS-decodes the RPS code $RPS_1$ to recover the data allocated to the $BL_1$.

Similarly, the middleware $M_R$ recovers data allocated to the respective blocks $BL_2, \ldots, BL_N$. Further, the middleware $M_R$ assorts the data $D_A$ corresponding to the application software $A_T$ and the data $D_B$ corresponding to the application software $B_T$. Also, the middleware $M_R$ inputs the data $D_A$ and the data $D_B$ to the application software $A_R$ and the application software $B_R$, respectively.

As described above, data is transmitted according to the UDP and thus, throughput may be enhanced to the extent that the frequency of the transmission confirmation may be suppressed. Further, data is RPS-encoded and thus, data may be recovered even when some of the RPS codes are lost on the transmission path. Therefore, data transmission reliability is enhanced. Further, the RPS code having an excellent loss correction capability is applied and thus, the frequency of retransmission request is decreased and throughput is further enhanced.

(RPS Encoding and Decoding)

Figure 7:
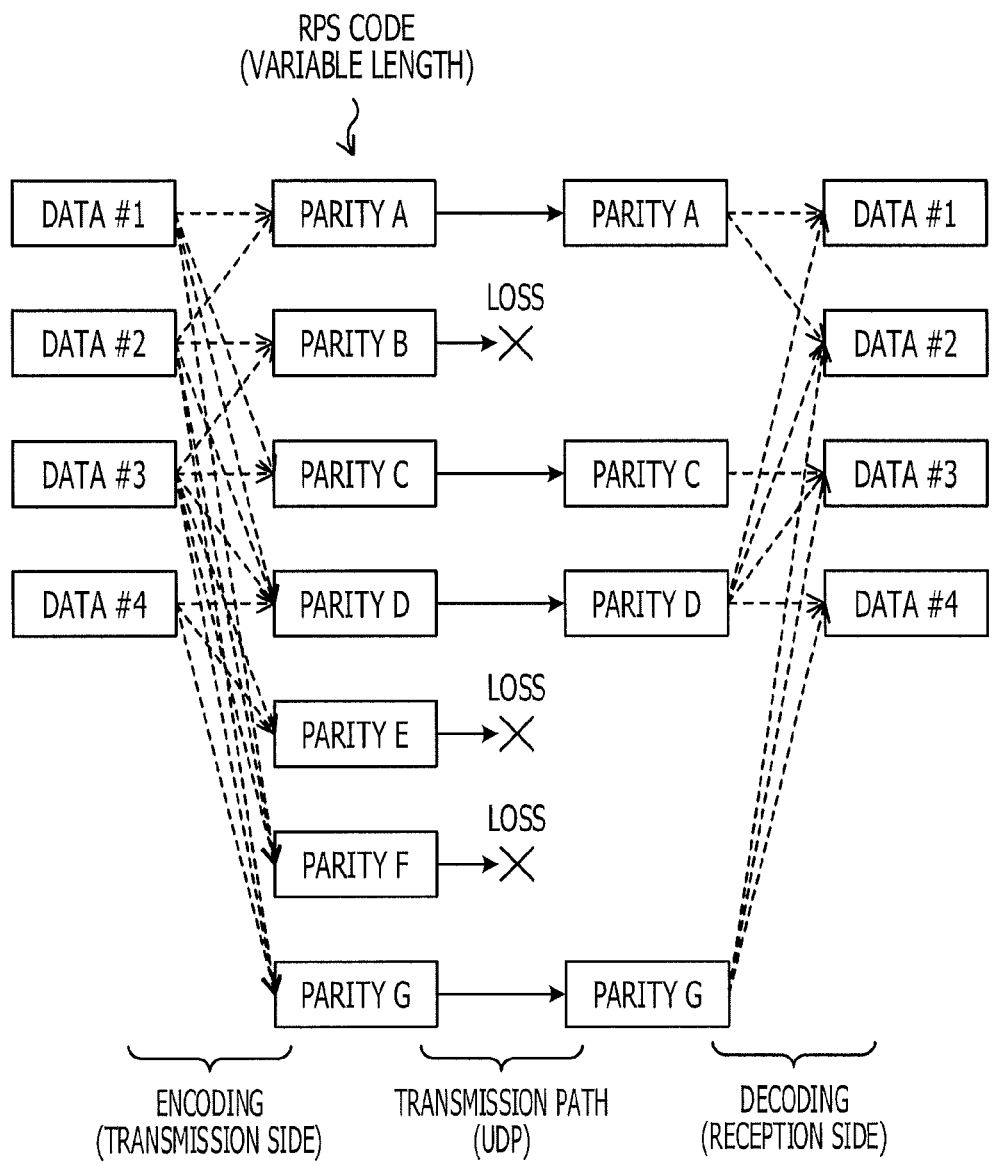
FIG. 7 is a view explaining an RPS encoding process and an RPS decoding process.

Here, a specific example of an RPS encoding process and a RPS decoding process are described with reference to FIG. 7. FIG. 7 is a view explaining the RPS encoding process and the RPS decoding process. The example of FIG. 7 illustrates a process in which the data packets #1~#4 are RPS-encoded to be transmitted and the data packets #1~#4 are RPS-decoded to be recovered.

A plurality of data packets to be transmitted are combined and thus, all the data packets are converted into a plurality of parity packets in the RPS encoding scheme as illustrated in FIG. 7. The combination of the data packets used for generating each parity packet is set in such a manner that the possibility of recovering all the data packets for the parity packet loss becomes high. For example, the combination of the data packets may be determined by a simulation.

Further, the number of the parity packets generated by the RPS encoding for a predetermined number of data packets may be arbitrarily changed. Therefore, it becomes possible to flexibly respond to a situation such as, for example, when a transmission path having a high packet loss ratio is used, when the number of parity packets is increased, otherwise when a transmission path having a low packet loss ratio is used, and when the number of parity packets is decreased.

In the example of FIG. 7, the parity packet A is generated using the data packets #1 and #2 and the parity packet B is generated using the data packets #2 and #3. Further, the parity packet C is generated using the data packets #1 and #3 and the parity packet D is generated using the data packets #1, #2, #3 and #4.

Further, the parity packet E is generated using the data packets #3 and #4, the parity packet F is generated using the data packets #1, #2 and #3 and the parity packet G is generated using the data packets #2, #3 and #4. As such, each parity packet is generated using a plurality of the data packets.

As illustrated in FIG. 7, the parity packets A~G are transmitted according to the UDP. When some parity packets B, E and F are lost on the transmission path, the data packet #1 is recovered using the parity packets A and D, and the data packet #2 is recovered using the parity packets A, D and G. Further, the data packet #3 is recovered using the parity packets C, D and G and the data packet #4 is recovered using the parity packets D and G.

In the example of FIG. 7, the parity packets B, E and F are lost on the transmission path, but all the data packets #1~#4 are recovered. As such, when the combination of the parity packets used for recovering each data packet is appropriate, each data packet may be correctly recovered even when some parity packets are lost on the transmission path.

Figure 8:
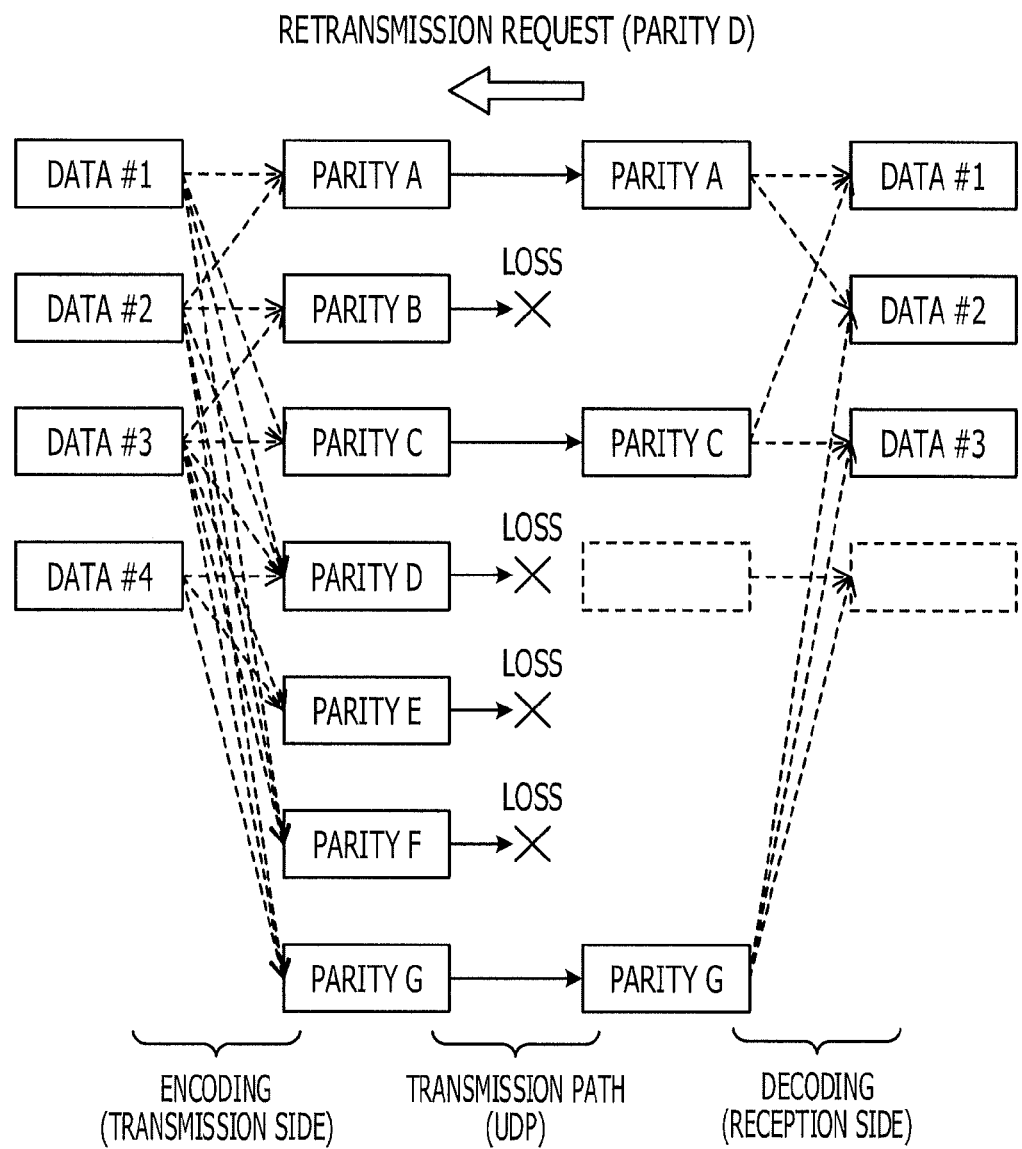
FIG. 8 is a view explaining a retransmission request method in the data transmission method using the RPS code and the UDP.

The RPS code is a code having a high loss correction capability, but some data packet becomes unrecoverable when many data packets are lost on the transmission path. For example, as illustrated in FIG. 8, when the parity packets B, D, E and F are lost, the data packet #4 becomes unrecoverable. In this case, the retransmission control of the parity packets used for recovering the data packet #4 is performed. FIG. 8 is a view explaining a retransmission control method in a data transmission method using the RPS code and the UDP.

The data packet #4 may be recovered, for example, when the parity packets D and G are present. That is, when the parity packet D is retransmitted, the data packet #4 may be recovered. Therefore, retransmission of the parity packet D is requested in the example of FIG. 8. However, the data packet #4 may also be recovered with a combination of the parity packets E and G and thus, the retransmission of the parity packet E may be requested. As such, there may be a case where the parity packet requested for retransmission may be selected.

When the parity packet requested for retransmission can be selected, the combination of parity packets to be retransmitted may be selected in such a manner that the number of parity packets to be retransmitted is further decreased.

For example, when there is a parity packet X which is able to decode two data packets and a parity packet Y which is able to decode four data packets, retransmission of the parity packet Y may be requested. The parity packet is selected in such a manner and thus, all the data packets may be efficiently recovered.

As described above, the number of parity packets used for transmitting a predetermined number of data packets may be arbitrarily changed in the RPS encoding. Therefore, for example, an adjustment may be made in such a manner that the number of parity packets is decreased on the transmission path having a low packet loss ratio and the number of parity packets is increased on the transmission path having a high packet loss ratio.

(Data Transmission Method)

Figure 9:
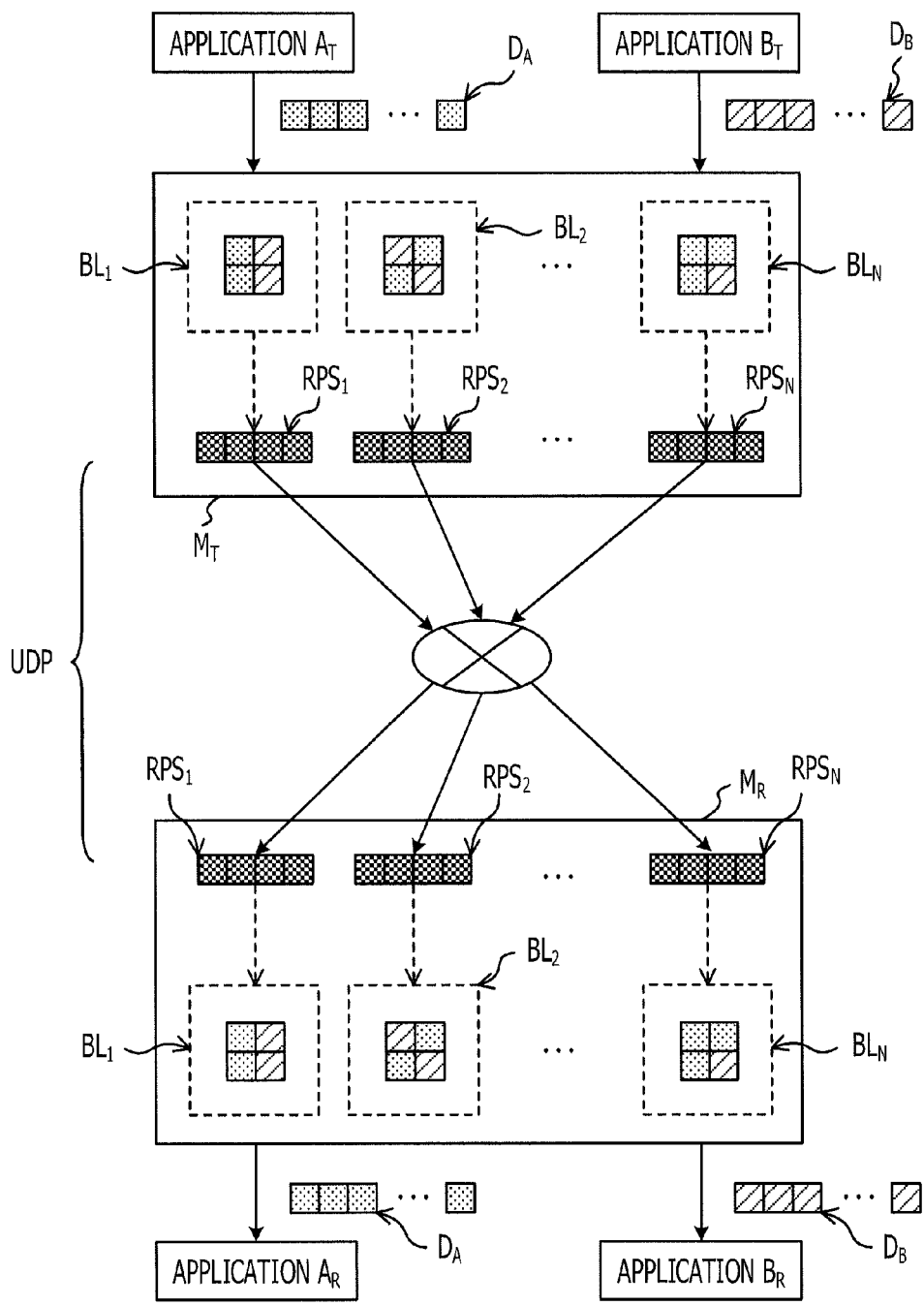
FIG. 9 is a block diagram illustrating an exemplary data communication method according to the second embodiment.

FIG. 9 is a block diagram illustrating an exemplary data communication method according to the second embodiment. The example of FIG. 9 illustrates a process in which the data $D_A$ and $D_B$ are transmitted from the application software of the transmission side $A_T$ and $B_T$ to the application software of the reception side $A_R$ and $B_R$, respectively.

The data packet of the data $D_A$ provided from the application software $A_T$ is allocated to the block $BL_1$, for example, by the middleware $M_T$. However, in the example of FIG. 9, the middleware $M_T$ does not perform an allocation in which the entire data amount capable of being allocated to the block $BL_1$ is filled with the data packets of the data $D_A$. Therefore, even after the data packets of the data $D_A$ are allocated, the data amount capable of being allocated remains in the block $BL_1$.

The middleware $M_T$ allocates the data packets of the data $D_T$ provided from the application software $B_T$ to the block $BL_1$ to the extent of the remaining data amount. Similarly, the middleware $M_T$ also impartially allocates the data packets of the data $D_A$, $D_B$ to the blocks $BL_2$, . . . , $BL_N$.

The middleware $M_T$ RPS-encodes the data packets allocated to the block $BL_1$ to generate the RPS code $RPS_1$. Similarly, the middleware $M_T$ generates the RPS code $RPS_2$, . . . , $RPS_N$ that correspond to the respective blocks $BL_2$, . . . , $BL_N$. The RPS codes $RPS_1$, . . . , $RPS_N$ are transmitted to the middleware $M_R$ that runs on the information processing apparatus 130 of the reception side according to the UDP.

The middleware $M_R$ RPS-decodes the RPS code $RPS_1$ to recover the data packets allocated to the block $BL_1$. Similarly, the middleware $M_R$ recovers the data packets that correspond to the respective blocks $BL_2$, . . . , $BL_N$. Further, the middleware $M_R$ assorts the recovered data packets for each session to recover the data $D_A$ corresponding to the application software $A_T$ and data $D_B$ corresponding to the application software $B_T$. Also, the middleware $M_R$ inputs the data $D_A$ and the data $D_B$ to the application software $A_R$ and the application software $B_R$, respectively.

Also in the method as described above, similarly to the example of FIG. 6, data is transmitted according to the UDP and thus, throughput may be enhanced to the extent that the frequency of the transmission confirmation may be suppressed. Further, data is RPS-encoded, and thus, data may be recovered even when some of the RPS codes are lost in the transmission path. Accordingly, reliability of data transmission is enhanced. Further, the RPS code having a high loss correction capability is applied and thus, the frequency of the retransmission request is reduced to further enhance the throughput.

Further, the data $D_A$ and $D_B$ provided from the application software $A_T$ and $B_T$, respectively, are impartially allocated to a single block and thus, delay in the data transmission of the other application software may be suppressed as compared to a case where a single block is occupied by a single application software. As a result, impartiality between the application software $A_T$ and $B_T$ may be ensured.

Figure 10:
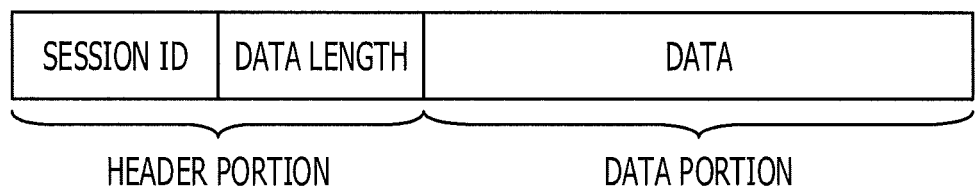
FIG. 10 is a diagram illustrating an example of a data packet structure according to the second embodiment.

However, when using the method as described above, the data packets of data provided from a plurality of application software are mixed in a single block. Therefore, the header included in the data packet includes the identification information (session ID) for identifying the session as illustrated in FIG. 10. FIG. 10 is a diagram illustrating an example of a data packet structure according to the second embodiment.

As illustrated in FIG. 10, the data packet includes a header portion and a data portion. The data portion includes data provided from the application software. The header portion includes information indicating a session ID and a data length.

The session ID is identification information for specifying, for example, a session established between the application software $A_T$ and the middleware $M_T$. The session ID included in the data packet is utilized at reception side and thus, the data packet may be assorted for each session.

According to the data transmission method described above, even in a case where a certain application software continuously inputs a large amount of data causing a plurality of blocks to be occupied by the input data or a case where the retransmission request is frequently performed, the number of occurrence of a situation where other application software wait for a long time becomes smaller.

In the meantime, a plurality of port numbers (sessions) are used between the application software of the transmission side and the transport layer of the transmission side. Similarly, a plurality of port numbers (sessions) are used between the application software and the transport layer of the reception side. However, only a single port number is used between the transport layer of the transmission side and the transport layer of the reception side (between the middlewares $M_T$ and $M_R$ (WAN section)). That is, when data for the plurality of sessions are fully filled into a single block, a port conversion occurs to allow multiplexing of data into a single session to be performed in the WAN section.

(Transmission Process)

Figure 11:
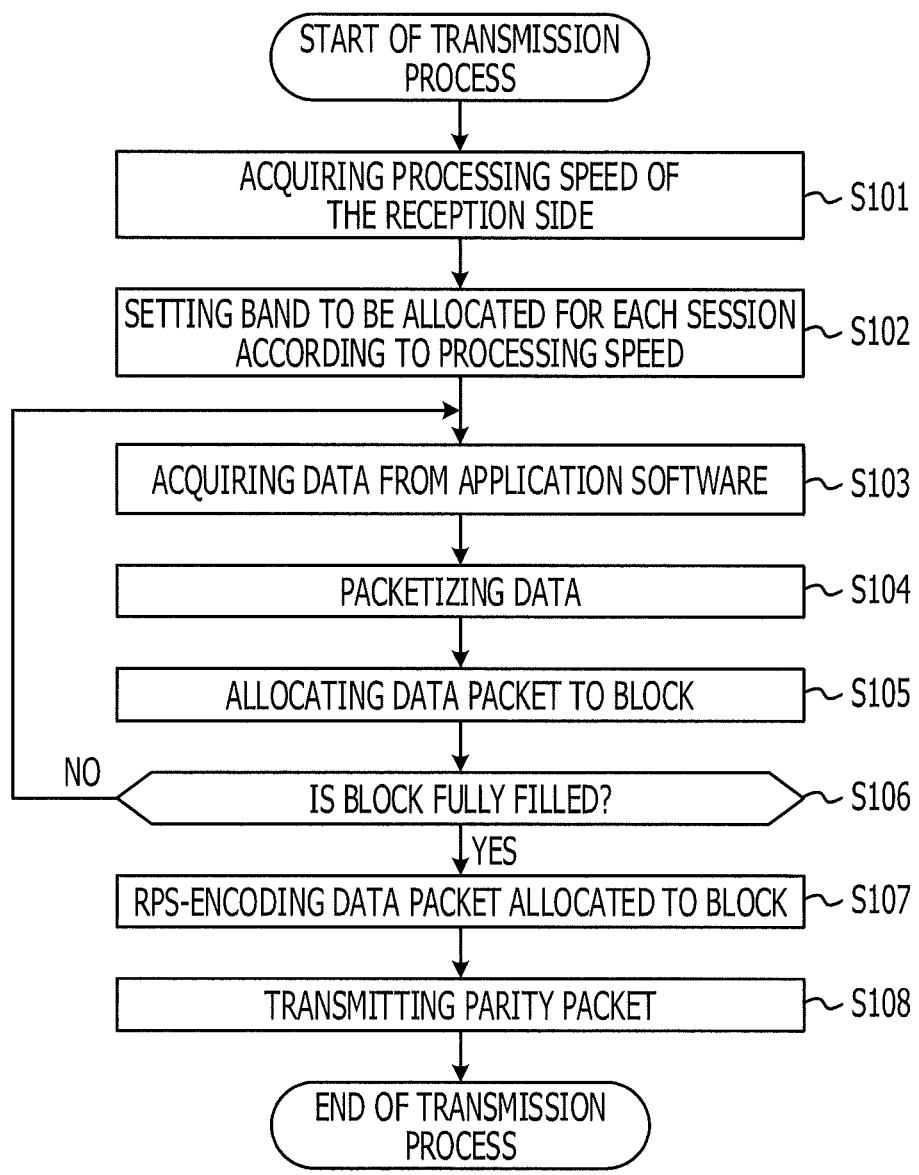
FIG. 11 is a view explaining a flow of a transmission process according to the second embodiment.

Subsequently, a flow of transmission process according to the second embodiment will be described with reference to FIG. 11. FIG. 11 is a view explaining a flow of a transmission process according to the second embodiment. The transmission process illustrated in FIG. 11 is performed by the information processing apparatus 110 of the transmission side.

At S101, the control unit 116 transmits the dummy packet to the information processing apparatus 130 of the reception side to acquire the processing speed information from the information processing apparatus 130 of the reception side. In the meantime, the processing speed information may be adapted to be regularly acquired.

At S102, the control unit 116 sets a band to be allocated for each session based on the processing speed information acquired from the information processing apparatus 130 of the reception side. The control unit 116 sets a transmission rate of data capable of being output to the information processing apparatus 130 of the reception side to the acquired processing speed. The control unit 116 allocates the transmission rate to each session. The control unit 116 first divides the set transmission rate into the number of application software. When a certain application software has established a plurality of sessions, the control unit 116 further divides the transmission rate allocated to the application software into the number of sessions and allocates the divided transmission rate to each session.

At S103, the data input unit 111 acquires data from single application software.

At S104, the packet generating unit 120 appends the header including identification information (session ID) of the session to data acquired from a single application software to generate the data packet.

At S105, the blocking unit 113 allocates the data packet generated at S104 to the block. At S106, when a number of data packets capable of being allocated to a single block are allocated to the single block (when the block is fully filled), the process proceeds to S107. In the meantime, when the block is not fully filled, the process proceeds to S103.

At S107, the error correction encoding unit 114 RPS-encodes the data packet allocated to the block to generate the parity packet. At S108, the communication unit 115 transmits the parity packet generated at the processing of S106 to the information processing apparatus 130 of the reception side. When the processing of S108 is ended, a series of processes illustrated in FIG. 11 are ended.

(Processing Speed Acquisition Method)

Figure 12:
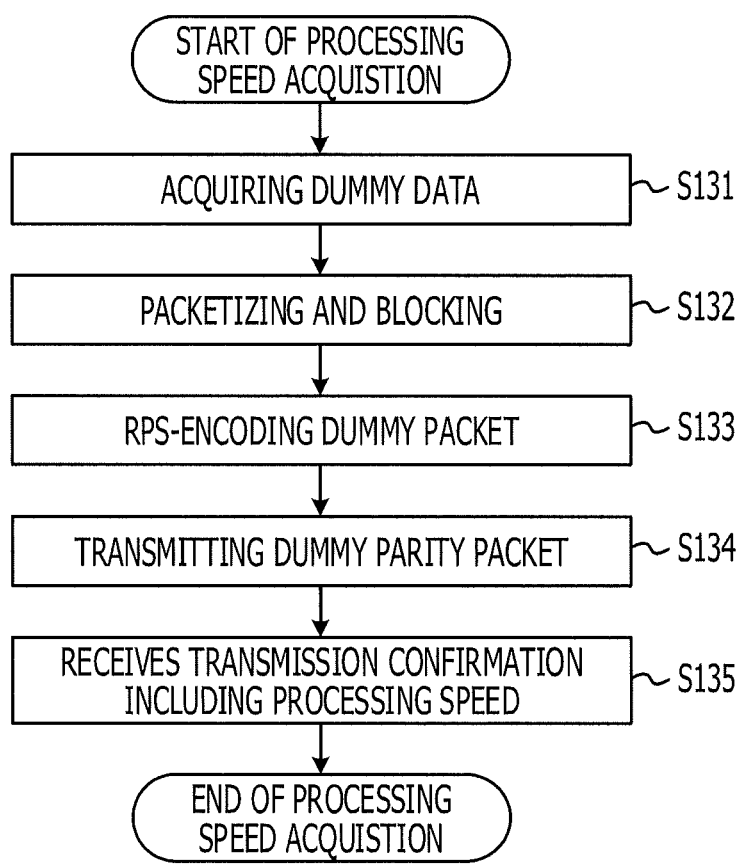
FIG. 12 is a view explaining a processing speed acquisition method according to the second embodiment.

Here, a flow of processing operations of a processing speed acquisition method according to the processing of S101 will be described with reference to FIG. 12. FIG. 12 is a view explaining a processing speed acquisition method according to the second embodiment.

At S131, the control unit 116 acquires the dummy data prepared in advance. At S132, the packet generating unit 120 appends a header to the dummy data to generate a dummy packet. The blocking unit 113 allocates the dummy packet to the block.

At S133, the error correction encoding unit 114 RPS-encodes the dummy packet allocated to the block to generate a dummy parity packet. At S134, the communication unit 115 transmits the dummy parity packet generated at the processing of S133 to the information processing apparatus 130 of the reception side. The information processing apparatus 130 of the reception side, upon receiving the dummy parity packet, calculates the processing speed using the processing time taken for performing a dummy packet decoding process and a data amount of the dummy data, and inserts the processing speed information into the transmission confirmation for transmission.

At S135, the communication unit 115 receives the transmission confirmation including the processing speed information. Further, the control unit 116 extracts the processing speed information from the transmission confirmation. When the processing of S135 is ended, a series of processes illustrated in FIG. 12 are ended.

(Processing Speed Measurement Process)

Figure 13:
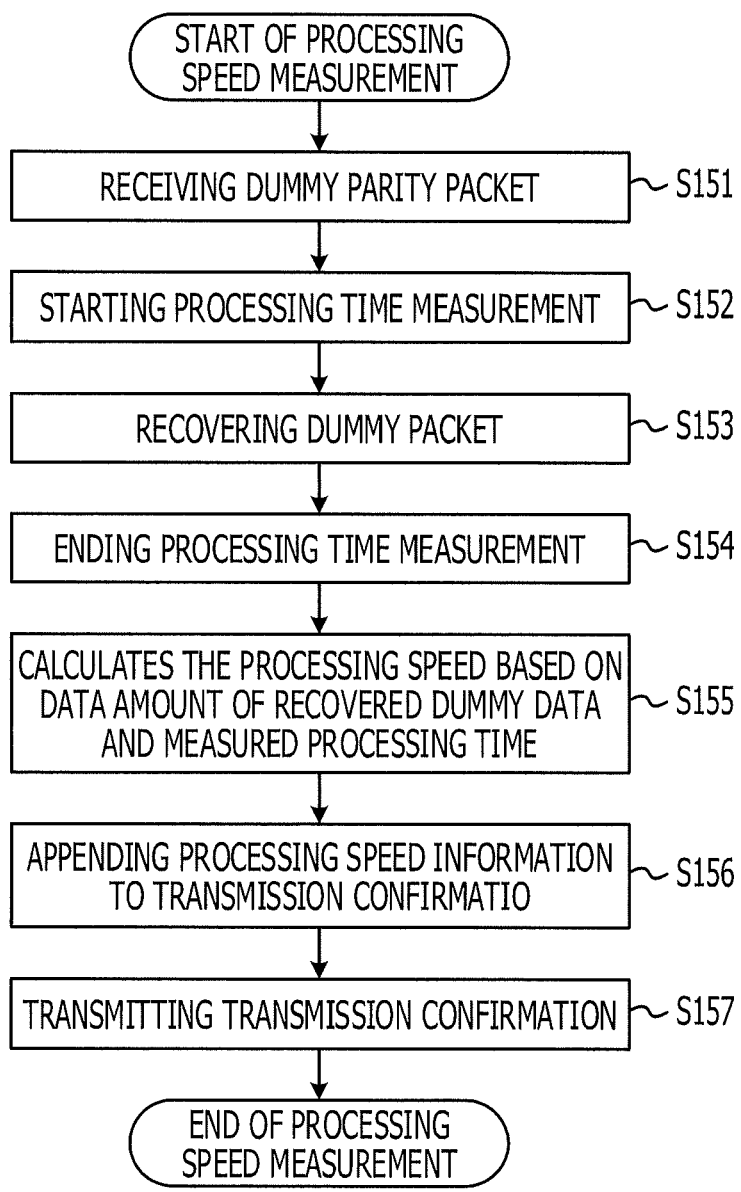
FIG. 13 is a view explaining a processing speed measurement method according to the second embodiment.

Subsequently, a flow of the processing speed measurement process will be described with reference to FIG. 13. FIG. 13 is a view explaining a processing speed measurement method according to the second embodiment.

At S151, the communication unit 131 receives the dummy parity packet from the information processing apparatus 110 of the transmission side. At S152, the loss correction decoding unit 132 starts the processing time measurement at the same time of starting an RPS decoding process for the dummy parity packet.

At S153, the loss correction decoding unit 132 performs the RPS decoding process for the dummy parity packet to recover an original dummy packet. At S154, the loss correction decoding unit 132 completes the recovery of the dummy packet to finish the processing time measurement.

At S155, the loss correction decoding unit 132 calculates the processing speed indicating the amount of data that would have been able to be recovered per unit time based on the data amount of the recovered dummy data and the measured processing time. At S156, the communication unit 131 appends the processing speed information calculated at the processing of S155 to the transmission confirmation for notifying that the recovery of the dummy data has been completed.

At S157, the communication unit 131 transmits the transmission confirmation to the information processing apparatus 110 of the transmission side. When the processing of S157 is ended, a series of processes illustrated in FIG. 13 are ended.

(Reception Process)

Subsequently, a flow of reception process according to the second embodiment will be described with reference to FIG. 14. FIG. 14 is a view explaining a flow of a reception process according to the second embodiment. The reception process illustrated in FIG. 14 is performed by the information processing apparatus 130 of the reception side.

At S171, the communication unit 131 receives parity packets for a single block.

At S172, the loss correction decoding unit 132 performs an error detection of the parity packet. At S173, the loss correction decoding unit 132 performs an RPS decoding process using the parity packet for which an error is not detected to recover the data packets.

At S174, when all the data packets for a single block are recovered at the processing of S173, the process proceeds to S176. In the meantime, when some of the data packets are not recovered at the processing of S173, the process proceeds to S175.

At S175, the retransmission control unit 133 requests the information processing apparatus 110 of the transmission side to retransmit the parity packet used for recovering the data packets that were not been able to be recovered at the processing of S173. According to the request, when the parity packet is retransmitted from the information processing apparatus 110 of the transmission side and the retransmitted parity packet is received by the communication unit 131, the process proceeds to S173.

At S176, the communication unit 131 transmits the transmission confirmation notifying that all the data packets are received to the information processing apparatus 110 of the transmission side. At S177, when an arrival order of the data packets are changed, the aligning unit 134 reorders to correct the order of the data packets that are in out of order.

At S178, the data output unit 135 determines a destination port number from the session ID included in the data packet and designates the destination port number to output data of the data packet to the application software. When the processing of S178 is ended, a series of processes illustrated in FIG. 14 are ended.

As described above, data is transmitted according to the UDP and thus, the throughput may be enhanced to the extent that the frequency of the transmission confirmation may be suppressed. Further, since data is RPS-encoded, data may be recovered even when some of the RPS codes are lost in the transmission path. Accordingly, reliability of data transfer is enhanced. Further, an RPS code having a high loss correction capability is applied and thus, the frequency of the retransmission request is reduced, thereby further enhancing throughput. Further, data provided from a plurality of application software are impartially allocated to each block and thus, a situation does not occur where one application software waits until the processing for the data allocated to each block is ended. As a result, impartiality between the application software may be ensured.

Although descriptions have been made on the assumption that the RPS encoding is applied to the present disclosure as an example, a method in which an error correction code such as an LDPC code or a turbo code, instead of the RPS code is applied may be considered as well. In this case, the data packets of data provided from a plurality of other application software are mixed in a data packet group to be subjected to encoding to distinguish the data packet recovered at the reception side and thus, impartiality between the application software may be ensured. Further, a method of adjusting a code length according to the processing speed of the reception side or a method of adjusting the amount of data to be subjected to encoding is applied and thus, a high throughput may be stably maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method executed by an information processing apparatus capable of transmitting data of a plurality of sessions to another information processing apparatus, the method comprising:
   acquiring processing time information from the another information processing apparatus according to a time taken for processing, by the another information processing apparatus, a first data received by the another information processing apparatus, where the processing the first data is performing calculations or writing data into an auxiliary storage device;
   wherein the acquiring the processing time information includes:
   acquiring dummy data prepared in advance;
   generating a dummy packet by appending a header to the dummy data;
   allocating the generated dummy packet to a block;
   generating a dummy parity packet by encoding the dummy packet allocated to the block; and
   transmitting the generated dummy parity packet as the first data to the another information processing apparatus,
   acquiring the processing time information calculated using a processing time for decoding the dummy parity packet and a data amount of the dummy data;
   calculating an upper limit value of an amount of data per unit time permitted to each of the plurality of sessions for transmission using the acquired processing time information; and
   limiting the amount of data for each of the plurality of sessions based on whether or not the amount of data exceeds the upper limit value calculated at the calculating upon transmitting a second data including data of one or more sessions to the another information processing apparatus.

2. The communication method according to claim 1, wherein the first data and the second data are encoded data, and
   the time taken to process the first data includes a time for decoding the first data by the another information processing apparatus.

3. The communication method according to claim 1, wherein the limiting the amount of data for each session limits receiving data of the session from an application software which has established the session.

4. The communication method according to claim 1, wherein each of the plurality of sessions is established by any one of a plurality of application software,
   a first session and a second session of the plurality of sessions have been established by the same application software, and
   the calculating an upper limit value calculates an upper limit value of each of the plurality of the application software and an upper limit value of each of the first session and the second session from the upper limit value of the same application software.

5. An information processing apparatus capable of transmitting data of a plurality of sessions to another information processing apparatus, comprising:
   a memory; and
   a processor coupled to the memory, wherein the processor is configured to:
   acquire processing time information from the another information processing apparatus according to a time taken for processing, by the another information processing apparatus, a first data received by the another information processing apparatus, where the processing the first data is performing calculations or writing data into an auxiliary storage device,
wherein the acquire the processing time information includes:
acquire dummy data prepared in advance;
generate a dummy packet by appending a header to the dummy data;
allocate the generated dummy packet to a block;
generate a dummy parity packet by encoding the dummy packet allocated to the block; and
transmit the generated dummy parity packet as the first data to the another information processing apparatus,
acquire the processing time information calculated using a processing time for decoding the dummy parity packet and a data amount of the dummy data;
calculate an upper limit value of an amount of data per unit time permitted to each of the plurality of sessions for transmission using the acquired processing time information, and
limit the amount of data for each of the plurality of sessions based on whether or not the amount of data exceeds the calculated upper limit value upon transmitting a second data including data of one or more sessions to the another information processing apparatus.

6. A non-transitory computer-readable storage medium storing a computer executable program that, when executed, causes a computer to perform a process executed by an information processing apparatus capable of transmitting data of a plurality of sessions to another information processing apparatus, the process comprising:
acquiring processing time information from the another information processing apparatus according to a time taken for processing, by the another information processing apparatus,
a first data received by the another information processing apparatus, where the processing the first data is performing calculations or writing data into an auxiliary storage device;
wherein the acquiring the processing time information includes:
acquiring dummy data prepared in advance;
generating a dummy packet by appending a header to the dummy data;
allocating the generated dummy packet to a block;
generating a dummy parity packet by encoding the dummy packet allocated to the block; and
transmitting the generated dummy parity packet as the first data to the another information processing apparatus,
acquiring the processing time information calculated using a processing time for decoding the dummy parity packet and a data amount of the dummy data;
calculating an upper limit value of an amount of data per unit time permitted to each of the plurality of sessions for transmission using the acquired processing time information; and
limiting the amount of data for each of the plurality of sessions based on whether or not the amount of data exceeds the calculated upper limit value upon transmitting a second data including data of one or more sessions to the another information processing apparatus.

7. The communication method according to claim 1, wherein when a present time taken for processing is longer than a past time taken for processing, reducing the upper limit value.

8. The communication method according to claim 1, wherein when a present time taken for processing is shorter than a past time taken for processing, increasing the upper limit value.

9. The communication method according to claim 1, wherein the processing time information is a processing speed.

10. The communication method according to claim 1, further comprising:
acquiring a round-trip time in addition to the processing time information, and
calculating the upper limit value using the acquired processing time information and the round-trip time.

11. The communication method according to claim 1, further comprising:
acquiring an amount of recovered data in addition to the processing time information, and
calculating the upper limit value using the acquired processing time information and the amount of recovered data.

12. The communication method according to claim 1, wherein the processing time information does not include a time taken for transmitting the first data between the information processing apparatus and the another information processing apparatus.

13. The communication method according to claim 1, wherein the processing time information comprises time taken to process known data that was sent to the another information processing apparatus.

14. The information processing apparatus according to claim 5,
wherein the processing time information comprises time taken to process known data that was sent to the another information processing apparatus.

15. The non-transitory computer-readable storage medium according to claim 6,
wherein the processing time information comprises time taken to process known data that was sent to the another information processing apparatus.

16. The communication method according to claim 1,
Wherein the calculating includes:
setting a transmission rate of data capable of being output to the another information processing apparatus;
dividing the set transmission rate into a number of a plurality of application software;
when a certain application software among the plurality of application software has established a plurality of sub sessions, further dividing the transmission rate allocated to the certain application software into a number of the plurality of sub sessions, and
calculating the upper limit value by allocating the divided transmission rate to each of the plurality of sessions.

* * * * *